United States Patent [19]

Collins

[11] 4,451,066
[45] May 29, 1984

[54] HITCH ASSEMBLY

[76] Inventor: Edmond R. Collins, Rte. #1, Box 103-A, Pitts, Ga. 31072

[21] Appl. No.: 408,138

[22] Filed: Aug. 16, 1982

[51] Int. Cl.³ .............................................. B60D 1/02
[52] U.S. Cl. ................................ 280/508; 280/415 A; 280/515
[58] Field of Search ........... 280/508, 509, 515, 415 A, 280/415 R

[56] References Cited

U.S. PATENT DOCUMENTS

| | | | |
|---|---|---|---|
| 2,478,736 | 8/1949 | Balzer | 280/508 |
| 3,161,422 | 12/1964 | Wade | 280/508 |
| 3,190,677 | 6/1965 | Robbins | 280/515 |
| 3,912,302 | 10/1975 | Patterson | 280/508 |

Primary Examiner—Joseph F. Peters, Jr.
Assistant Examiner—Donn McGiehan
Attorney, Agent, or Firm—William M. Hobby, III

[57] ABSTRACT

A hitch adaptor assembly is provided which converts a manual hitch to an automatic hitch and which rapidly connects to the existing hitch. The hitch assembly includes a frame having angled guides to guide the trailer hitch pin on a trailer tongue and to the trailer hitch. The frame is attached with threaded bolts using the existing trailer hitch, trailer pin opening and a pair of existing openings therein. A spring loaded hitch locking bolt is mounted to the frame and spring biased to close behind a trailer hitch bolt. A spring loaded catch is utilized for holding the locking bolt in a cocked position until the trailer pin drives the catch back to release the locking bolt.

6 Claims, 3 Drawing Figures

U.S. Patent    May 29, 1984    4,451,066
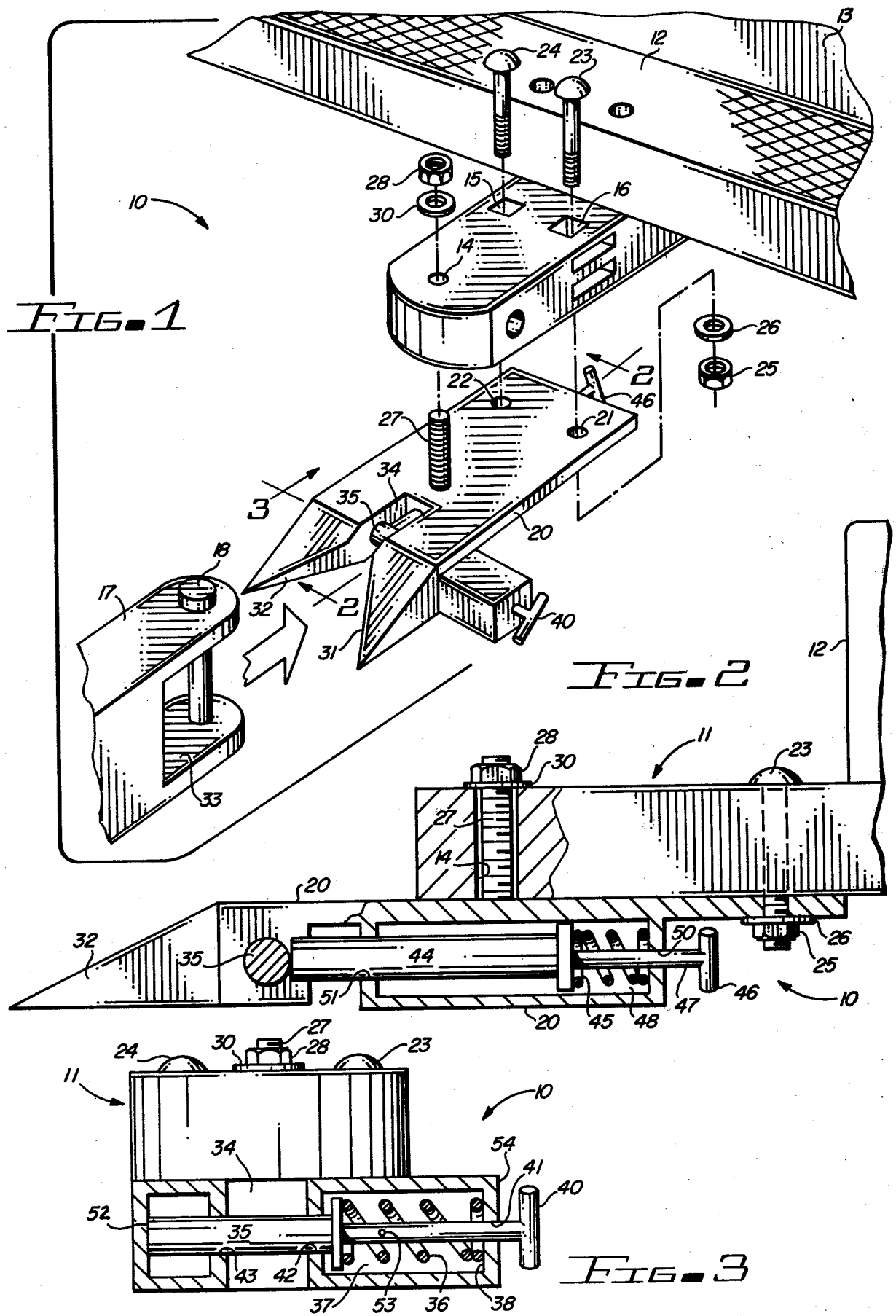

HITCH ASSEMBLY

BACKGROUND OF THE INVENTION

The present invention relates to trailer hitch assemblies and especially to a hitch adapter for converting a manual hitch to an automatic trailer hitch which can be easily attached to an existing hitch without special tools.

In the past, there has been a great variety of trailer hitches for a variety of applications, but it has been common to attach to a pickup truck or other vehicle a simple farmer's hitch which allows the pickup to pull a trailer or equipment by attaching the trailer to the hitch with a trailer pin. This type of hitch is inexpensive and fits a wide variety of purposes for utility vehicles like a pickup truck. There have also been numerous other trailer hitches for a wide variety of purposes, including a variety of automatic coupling hitches. Typical of automatic coupling hitches which are relevent to the present invention includes U.S. Pat. No. 1,448,950 for an automatic coupling for vehicles which utilizes a dropping lever pin actuated by the pushing back of a spring biased plate. In U.S. Pat. No. 3,161,422 a funnel shaped hitch guides a special tongue connector from a trailer tongue into the hitch assembly where it can be locked in place. U.S. Pat. No. 4,023,822 shows a coupling hook for a guide member of a tractor three point attachment. In U.S. Pat. No. 2,113,338 a vehicle coupling has a specially designed trailer tongue coupling eye which is directed against a locking lever to release a coupling pin to couple the trailer to the hitch. In U.S. Pat. No. 4,258,930 a hitching device has a safety lock for mounting to a tractor and includes two laterally opposing jaws and a hook member pivotaly connected therebetween for capturing an upstanding hitch pin. U.S. Pat. Nos. 2,760,790; 2,650,103; 3,330,579; and 3,912,302 each show hitch constructions for coupling a trailer or the like to the hitch of a vehicle.

The present invention utilizes a principal similar to that taught in the prior cited patents, but advantageously allows a trailer hitch to be quickly attached to an existing farmer's hitch to convert a manual hitch to an automatic hitch without modifying the trailer tongue and without special tools or welding.

SUMMARY OF THE INVENTION

A hitch adaptor assembly for converting a manual hitch to an automatic hitch includes a frame having a pair of angled guides to guide a trailer hitch pin on a trailer tongue into the hitch. The frame has threaded attaching members, such as bolts and nuts, for attaching a frame to an existing manual trailer hitch and protruding therefrom to intercept a trailer hitch pin. The frame is attached to the manual hitch using the hitch pen opening of the manual hitch, plus other predetermined openings in the manual hitch. A spring loaded hitch locking bolt is mounted to the frame and is biased by a spring to close and lock the trailer hitch pin into position in the trailer hitch. A spring loaded catch holds the spring loaded hitch lock bolt in a cocked position to receive the trailer tongue hitch pin; and also maintain the constant spring biased pressure against the hitch pin once the trailer is connected to the hitch. The spring loaded hitch locking bolt and the spring loaded catch each have handles for rapidly cocking the hitch locking bolt. The hitch adaptor assembly is rapidly attached to an existing farmer's hitch with three nuts, bolts and lock washers.

BRIEF DESCRIPTION OF THE DRAWINGS

Other objects, features and advantages of the present invention will be apparent from the written description and the drawings, in which:

FIG. 1 is an exploded perspective view of a hitch adaptor assembly farmer's hitch attached to the bumper of a vehicle and a trailer tongue trailer pin;

FIG. 2 is a sectional view taken on the line 2—2 of FIG. 1; and

FIG. 3 is a sectional view taken on the line 3—3 of FIG. 1.

DESCRIPTION OF THE PREFERRED EMBODIMENT

Referring to the drawings, a trailer hitch adaptor assembly 10 is shown for converting a manual farmer's hitch 11 to an automatic trailer hitch. Farmer's hitch 11 is attached to a bumper 12 of a pickup truck 13 and includes a trailer pin opening 14 as well as a pair of vertical openings 15 and 16 therethrough. The manual trailer hitch 11 normally would connect to a trailer gongue 17 with a trailer pin 18. In the present invention, the hitch adaptor assembly 10 has a frame 20 having a pair of openings 21 and 22 which align with the openings 15 and 16 for passing a pair of bolts 23 and 24 therethrough, which are locked with nuts 25 and a lock washer 26. A threaded stud 27 is attached to the top of the frame 20 in a position to be aligned with the trailer pin opening 14 and is attached to the farmer's hitch 11 with a nut 28 and lock washer 30. Thus, the hitch adaptor 10 is attached to the existing hitch 11 by three threaded connections which rapidly bolt the hitches together in a predetermined position to position the frong part of the hitch assembly 10 in frong of the front portion of the hitch 11. The frong portion of the hitch assembly 10 has a pair of angled guides or surfaces 31 and 32 to form a guide for directing the pin 18 mounted across the yolk 33 into a nesting position 34 where it is locked with a hitch locking bolt 35. The hitch locking bolt 35 is spring loaded with a spring 35 located in an inside cavity 37 between the locking bolt 35 and the surface 38. A handle 40 slides on an opening 41 while the bolt slides through an opening 42. The bolt 35 also slides in an opening 43 to lock the bolt on the opposite side of the nesting opening 34. A catch or sear member 44 is spring loaded with a spring 45 and has a handle 46 with a stem 47 connected to the catch 44 formed of a solid rod. The spring is located in a cavity 48 and rides between one surface of the cavity 48 and the catch 44 while the stem 47 rides in an opening 50 and the catch 44 rides in an opening 51. When the catch 44 is spring loaded in a forward position, it protrudes in front of the end 52 of the locking bolt 45 to hold it against the compressed spring 36. This cocking action is easily accomplished by pulling the handle 40 of the locking bolt 45 until the spring 45 of the catch 44 pushes the catch 44 in front of the end 52 of the bolt 35. As the trailer pin 18 approaches the hitch assembly 10, it is captured by an angled surface 31 and 32 and guided into the nesting position 34 driving the catch 44 backwards against the spring 45, thereby releasing a locking bolt 35 as soon as the pin 18 passes in front of the locking bolt 35.

The catch 44 then applies a continuous spring pressure from the compressed spring 45 aginst the hitch pin 18 to prevent the trailer tongue 17 from a jerking motion of a loose trailer pin. The trailer pin 18 can then be unlocked by simply pulling the handle 40 to remove the locking bolt 35 out of the way of the pin 18. The bolt 35 can be held by sliding a pin in the opening 53 which pin will then catch on the outer surface 54 and hold the locking bolt 35 out of the way of the hitch pin 18, until the catch bolt 44 moves forward.

It will be clear at this time that a hitch adaptor assembly for converting a manual hitch to an automatic hitch can be quickly attached to a standard farmer's hitch in a short period of time by three threaded connections and which does not require any change in the trailer tongue except for leaving the trailer pin in position. It will also be clear that the invention is not to be limited to the form shown, which is to be considered illustrative rather than restrictive.

I claim:

1. A hitch adaptor assembly to convert a manual hitch to an automatic hitch comprising in combination:
   a frame having angled guides formed thereon to guide a trailer hitch pin on a trailer tongue into the hitch frame;
   a frame attaching means including threaded members adapted to connect said frame to an existing hitch with a portion of said frame protruding in front of said existing hitch;
   a spring loaded hitch locking bolt mounted to said frame spring biased to close behind a trailer hitch pin positioned in said frame;
   a spring loaded catch bolt for holding said spring loaded hitch locking bolt in a cocked position, said spring loaded catch bolt being biased into the path of said locking bolt and in the path of a trailer pin being guided into said frame by said angled guides, whereby a manual trailer hitch can be easily converted to an automatic hitch.

2. A hitch adaptor assembly in accordance with claim 1, in which said frame attaching means includes three threaded attaching means, one of which is attached to said frame in a position to pass through a manual hitch trailer pin opening and having a nut threaded thereto.

3. A hitch adaptor assembly in accordance with claim 2, in which said spring loaded hitch locking bolt has a handle thereon for unlocking and cocking said hitch locking bolt.

4. A hitch adaptor assembly in accordance with claim 3, in which said spring loaded catch has a handle thereon.

5. A hitch adaptor assembly in accordance with claim 3, in which said spring loaded hitch locking bolt has an aperture therethrough for locking said spring loaded hitch locking bolt in an open position by the sliding of a pin through said opening when said hitch locking bolt is in an open position.

6. A hitch adaptor assembly in accordance with claim 5, in which said frame has a pair of openings to match existing openings on an existing manual hitch for passing a pair of bolts therethrough for locking said hitch adaptor assembly to said manual hitch.

* * * * *